United States Patent Office

3,542,863
Patented Nov. 24, 1970

3,542,863
PALLADIUM CATALYST TREATMENT WITH FORMIC ACID
Wilford J. Zimmerschied, Crown Point, Ind., assignor to Standard Oil Company, Chicago, Ill., a corporation of Indiana
No Drawing. Continuation-in-part of application Ser. No. 456,506, May 17, 1965. This application July 11, 1968, Ser. No. 743,920
Int. Cl. B01j *11/18;* C07c *51/42*
U.S. Cl. 260—525                    6 Claims

ABSTRACT OF THE DISCLOSURE

Hot formic acid treatment of palladium on carbon catalyst serves to bring the activity of the catalyst to a desirable level either when the catalyst has been deactivated by contact with copper ions or when the fresh catalyst has an undesirably high activity toward overhydrogenating aromatic rings or functional substituent groups whose presence is derived in a product subjected to catalytic hydrogen treatment.

---

This application is a continuation-in-part of my copending application Ser. No. 456,506, filed May 17, 1965, now abandoned.

Palladium catalysts have been found to be useful in processes where oxygenated hydrocarbons such as the aromatic acids, aldehydes, ketones, alcohols, and the like, are treated under reducing conditions. One significant process e.g., disclosed in Netherlands application 64—03348, concerns the purification of crude terephthalic acid which commonly produces a product with a purity above 99%. In that process, the acid and an aromatic aldehyde such as carboxybenzaldehyde as an impurity are dissolved in a suitable solvent such as water and the solution subjected to hydrogenation conditions in the presence of a palladium on carbon catalyst to reduce the aldehyde in addition to other impurities such as color bodies which may be present. The terephthalic acid is then recovered by crystallization purified free acid product.

In these processes, deactivation of the palladium catalysts occurs by copper ions in solvent water and it is important that activity of the catalyst be restored. In addition, there are instances where the initial activities of fresh catalysts are excessive and causes overhydrogenations, for example, of aromatic rings or such functional groups as carboxylic acid groups, to form a variety of substances which, although present in minor amounts, are quite undesirable, especially in a purification process because the original aromatic ring and/or the functional groups are desired in the recovered product.

I have discovered that the activity and/or reactivity of the palladium catalysts is controllable by contacting the catalysts with hot formic acid. When the catalysts have been previously deactivated due to their use with oxygenated hydrocarbons under reducing conditions, the treatment of the "spent" catalysts with hot formic acid at least partially restores their activity. When fresh catalysts exhibit excessive activity, the treatment with hot formic acid reduces the activity to avoid overhydrogenation and the formation of undesirable products in the intended processes.

Briefly, the invention is directed to processes for at least partially restoring the activity of spent palladium catalyst, especially spent by contact with copper ions during use as hydrogenation catalyst, by contacting such catalysts with hot formic acid and to processes for reducing the activity of fresh catalysts to avoid initial overhydrogenation by contacting these catalysts with hot formic acid before their use especially in the treatment of oxygenated hydrocarbons under reducing conditions. The invention is also directed to the catalysts produced by these processes.

Palladium catalysts useful in the inventive processes are preferably those identified with the treatment of oxygenated hydrocarbons under reducing conditions. While carbon-supported palladium catalysts are especially suitable, they are not considered critical to the processes. Catalysts of particular interest are those supported on charcoal having from 0.05 to about 1 wt. percent and advantageously about 0.2–0.6 wt. percent of palladium and useful in catalytic hydrogenation processes, especially in the purification of aromatic polycarboxylic acids.

As described above, deactivation of the catalysts occurs through their use with oxygenated hydrocarbons under reducing conditions and particularly with aromatic polycarboxylic acids in solutions containing aromatic aldehydes. These acids and aldehydes are commonly in combination in products from the oxidation of polyalkyl aromatics and particularly the polyalkyl benzenes to form the acids. Illustrative acids prepared by oxidation include the naphthalene carboxylic acids such as naphthoic acid; benzene hexacarboxylic acids such as mellitic acid; benzene tetracarboxylic acids such as pyromellitic dianhydride; benzene tricarboxylic acids such as trimellitic anhydride and trimesic acid; and benzene dicarboxylic acids such as terephthalic acid, isophthalic acid and phthalic anhydride. The aromatic aldehydes are usually present as by-products from the reactions which also may produce other by-products having substituents with various degrees of oxidation. In the purification of these acids, solutions of the acids and aldehydes in suitable solvents are employed. The more advantageous solvents depend on the particular compositions being treated. By way of illustration, in the purification of terephthalic acid, polar solvents such as water or acetic acid, and preferably the former, are very suitable.

To illustrate the effect of the deactivation of the catalysts in the above-described processes, a palladium on charcoal catalyst containing about 0.24 wt. percent palladium and initially less than 20 p.p.m. copper, which has been previously contacted with hydrogen and terephthalic acid containing about 0.95 wt. percent of 4-carboxybenzaldehyde dissolved in water containing less than 0.1 p.p.m. copper ion exhibits an activity of about 77.1% compared to its initial activity of about 99.7% (as measured by the ability of the catalyst to reduce the aldehyde). In the illustration, the terephthalic acid concentration is about 9 wt. percent and the catalyst loading is about 504 pounds of the acid per pound of catalyst. While it is not known for certain, it is believed that the deactivation of the catalyst is at least partially caused by copper contaminants in the aqueous solution, since the copper content of the catalyst increases during its use to about 1000–1200 p.p.m.

The activity of the catalyst is at least partially restored by contacting the spent catalyst with hot formic acid for a time sufficient to substantially and effectively produce an increase in the activity. The optimum times of contact will depend on the temperature of the hot formic acid which may be as low as 100° F. Advantageously, the formic acid is at approximately its boiling temperature which is 213° F. at 760 mm. Hg. Increased temperatures may be employed by the use of higher pressures. With boiling formic acid, contact times of about one hour are common.

The formic acid is then removed advantageously by boiling the catalyst with formic acid and subsequently removing the formic acid by evaporation or distillation. Drying of the catalyst is then usually completed by drying in a vacuum oven.

After treatment with the hot formic acid, the catalyst is regenerated and is again useful. Although the characteristics of the change in the catalyst as a composition are not known for certain, the effect of the change is the restoration of activity. The regenerated catalyst is believed to be a new composition of matter resulting from the heating of the formic acid with the palladium catalyst. A regenerated catalyst of particular interest is that produced from a spent catalyst which has been deactivated through contact under hydrogenation conditions with an aromatic polycarboxylic acid in a solution containing an aromatic aldehyde, and principally with terephthalic acid in an aqueous solution containing carboxybenzaldehyde and low, 0.001 to 0.1 p.p.m., copper ion concentration based on solvent water. Advantageously, the regenerated catalyst is the product of contacting the spent catalyst with formic acid at approximately its boiling temperature, boiling off formic acid and drying the catalyst so treated.

In addition to being effective with such spent catalysts, the treatment with formic acid is also surprisingly effective with fresh catalysts to control their activity and reduce their tendency to over-hydrogenate. This is of particular importance in processes in which oxygenated aromatic hydrocarbons are subjected to reducing conditions in the presence of palladium catalysts, since in many instances the hydrogenation of the aromatic nuclei is undesirable. When the process includes the purification of aromatic polycarboxylic acids such as terephthalic acid contaminated with impurities such as 4-carboxybenzaldehyde, over-hydrogenation can produce a number of hydrogenated aromatic products including several hydrogenated aromatic acids. The increase in the contaminants and the difference in their physical properties greatly increases the complexities of the purification process or the purified acid usefulness and therefore should be avoided.

Treatment of the fresh catalyst with hot formic acid reduces the tendency of the catalyst to initially over-hydrogenate and therefore provides an improvement in processes in which oxygenated aromatic hydrocarbons are subjected to reducing conditions in the presence of palladium catalysts. The improvement reduces the formation of hydrogenated aromatic nuclei and is accomplished by contacting the fresh catalyst (i.e. before its initial use with the oxygenated aromatic hydrocarbons) with hot to boiling formic acid to effect a reduction in the tendency of the catalyst to over-hydrogenate. As discussed above, the improvement is particularly important in processes for purifying aromatic carboxylic acids such as terephthalic acid in a solution of a polar solvent such as water, which contains an aromatic aldehyde such as carboxybenzaldehyde. But the improvement also benefits other catalytic hydrogenation process where hydrogenation needs be controlled. Advantageously, in those processes, hydrogen provides the reducing conditions and the catalyst is a palladium on charcoal catalyst containing less than 1 wt. percent palladium. Advantageously, the improvement is carried out by contacting the catalyst before its use, with formic acid at approximately its boiling temperature. Removal of the formic acid is advantageously carried out by evaporation. There is no need to separate treated catalyst from formic acid by filtration, decantation or other liquid-solid separation.

The following examples illustrate the preparation and utilization of some embodiments of this invention. It will be understood that these are for illustrative purposes only and do not purport to be wholly definitive with respect to conditions or scope.

EXAMPLE I

A spent palladium on charcoal hydrogenation catalyst, which initially had a palladium content of about 0.24 wt. percent, and became spent by reason of its contact under reducing conditions with copper ions was reactivated using a process of this invention. The catalyst had been used to treat an aqueous solution of terephthalic acid containing 4-carboxybenzaldehyde in the presence of dissolved hydrogen. Its activity, as measured with respect to the percentage of the aldehyde in solid terephthalic acid (which was crystallized later in the process), was about 0.218 wt. percent as compared to its initial activity of about 0.003 wt. percent. This meant that the catalyst was not as effective in hydrogenating the aldehyde as it had been initially. The spent catalyst also contained a small amount, 1000–1200 p.p.m., of copper.

In the process, a mixture of 5 g. of the spent catalyst and 100 ml. of 88 wt. percent formic acid was heated to a temperature of about 210–220° F. for about one hour. The excess formic acid was then evaporated from the sample, and completion of the drying was carried out in a vacuum oven at a temperature of about 140° F. (60° C.).

The activity of the regenerated catalyst was determined by its effectiveness in hydrogenating the 4-carboxybenzaldehyde contained as an impurity in terephthalic acid. About 30 g. of terephthalic acid containing 0.95 wt. percent of the aldehyde, about 350 g. of water, about 0.4 g. of the regenerated catalyst, and about 200 p.s.i.g. of hydrogen (pressure at ambient temperature) were placed in a one-liter shaker bomb which represented a reactor. The sealed reactor was heated to about 480° F. and shaken for two hours after which the terephthalic acid product was crystallized from solution, recovered and analyzed for the aldehyde by polarography. Table I below lists the results as well as the activity for the fresh and spent catalysts.

TABLE I

| Catalyst | Treatment | 4-CBA, percent of filter cake | Percent, 4-CBA removed |
|---|---|---|---|
| Fresh | None | 0.0032 | 99.7 |
| Spent | do | 0.218 | 77.1 |
| Regenerated | Formic acid | 0.0215 | 97.7 |

The above results demonstrate that the formic acid treatment was remarkably effective in restoring the activity of the catalyst. With the spent catalyst, about 0.218 wt. percent of aldehyde appeared in the product, whereas with the regenerated catalyst, only about 0.0215 wt. percent appeared, which was a reduction of about 90% in the aldehyde in the product.

For comparison purposes, Table II below lists the activities of the spent catalyst after being treated with other substances in attempts to restore its activity, together with the activities of the fresh and spent catalysts and the formic acid regenerated catalyst.

TABLE II.—CATALYST REGENERATION

| Technique | Conditions | 4-CBA, percent of filter cake | Percent, 4-CBA removed |
|---|---|---|---|
| HNO₃ (30%) | Ambient temperature | 0.150 | 84.2 |
| Hydrogen soak | 18 hrs., 700° F., 1800 p.s.i.g. | 0.23 | 75.8 |
| NaOH (5%) | Ca. 180° F | 0.132 | 86.1 |
| H₂SO₄ (30%) | 200–220° F | 0.110 | 88.4 |
| None | Fresh catalyst | 0.0032 | 99.7 |
| Do | Spent catalyst | 0.218 | 77.1 |
| HCOOH | 210–220° F | 0.0215 | 97.7 |

The above results demonstrate that the formic acid treatment was superior to any of the treatments using HNO₃, hydrogen soak, NaOH, or H₂SO₄. In addition, the treatments involving HNO₃ and H₂SO₄ were not only less effective but actually harmed the catalyst because subsequent treatments with formic acid on the nitric acid-treated and sulfuric acid-treated catalysts did not improve their activity.

EXAMPLE II

Another sample of the spent catalyst described in Example I was regenerated with formic acid according to the general procedures of Example I except that the formic acid was decanted rather than evaporated off from the catalyst. In addition, three separate treatments with formic acid at 210–220° F. were carried out. The effectiveness of this procedure is shown below in Table III together with values for the fresh and spent catalysts and the catalyst of Example I. The hydrogenation temperatures are shown for each test since for this example, the temperature for hydrogenation was 460° F. However, as shown for the fresh catalyst, the activities at both temperatures are essentially the same.

TABLE III

| Catalyst | Hydrogenation temp., °F. | 4-CBA, percent of filter cake | Percent, 4-CBA removed |
|---|---|---|---|
| Fresh | 480 | 0.0032 | 99.7 |
| Do | 460 | 0.0031 | 99.7 |
| Spent | 480 | 0.218 | 77.1 |
| Regenerated (Ex. II) | 460 | 0.0615 | 93.5 |
| Regenerated (Ex. I) | 480 | 0.0215 | 97.7 |

The above results demonstrate that the decanting of the formic acid produced a catalyst which exhibited 93.5% effectiveness. This is somewhat less than the 97.7% for the catalyst produced by evaporating off the formic acid; however, it is still considerably more effective than the untreated spent catalyst. However, it is preferred to boil off or distill off formic acid because higher reactivation of spent catalyst is effected.

EXAMPLE III

Two processes are carried out using as fresh catalyst one similar to the fresh catalyst of Example I before and after treatment with formic acid. In each process, an aqueous solution of terephthalic acid containing about 0.95 wt. percent 4-carboxybenzaldehyde and dissolved hydrogen is contacted with each catalyst. Inspection of the product from each process is carried out and reveals that the formation of hydrogenated aromatic nuclei is less in the second product (from formic acid treated fresh catalyst) and the 4-CBA content of the recovered product was satisfactorily diminished.

While the invention has been described in conjunction with specific examples thereof, these are illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

What is claimed is:

1. A method for reactivating the hydrogenation catalysis of palladium toward reduction of an aldehyde group in carboxybenzaldehydes when the palladium catalyst has been deactivated by copper, which method consists of heating the deactivated palladium catalyst and formic acid to a temperature in the range of 100 to 213° F. removing the formic acid from the treated catalyst by distillation or evaporation and drying the catalyst.

2. The method of claim 1 wherein the deactivated catalyst and formic acid is heated to its boiling point for about one hour and formic acid is removed by distillation or evaporation.

3. The method of claim 2 wherein the spent catalyst has 0.05 to 1.0 weight percent palladium on carbon.

4. In a process for purifying terephthalic acid in which an aqueous solution of said acid containing carboxybenzaldehyde is treated with hydrogen in the presence of palladium on charcoal catalyst containing less than about 1 weight percent palladium, the improvement for reducing the formation of hydrogenated aromatic nuclei, which improvement comprises contacting said catalyst before its use with said acid, with boiling formic acid and recovering said catalyst from said formic acid to effect a reduction of the tendency of said catalyst to hydrogenate said aromatic nuclei.

5. The process of claim 4 wherein said catalyst recovering includes removing said formic acid by evaporation.

6. The process of claim 4 wherein upon decrease of catalyst activity to about 77% with respect to carboxybenzaldehyde reduction the treatment of the solution with said deactivated catalyst is terminated, the deactivated catalyst is reactivated by said contacting with boiling formic acid, the formic acid is removed by evaporation and treatment of the solution is then continued.

References Cited

UNITED STATES PATENTS

| 2,006,221 | 6/1935 | Ridler | 252—413 |
| 2,704,281 | 3/1955 | Appell | 252—413 |
| 2,749,359 | 6/1956 | Calkins et al. | 252—413 |
| 3,058,997 | 10/1962 | Taylor et al. | 260—525 |
| 3,211,669, | 10/1965 | Unverferth | 252—416 |

FOREIGN PATENTS 6403348  9/1964  Netherlands.

DANIEL E. WYMAN, Primary Examiner

P. E. KONOPKA, Assistant Examiner

U.S. Cl. X.R.

252—413, 447, 472